May 29, 1934.　　　P. M. J. BOEVER　　　1,960,892
LONG BONE FRACTURE CLAMP
Filed March 3, 1932
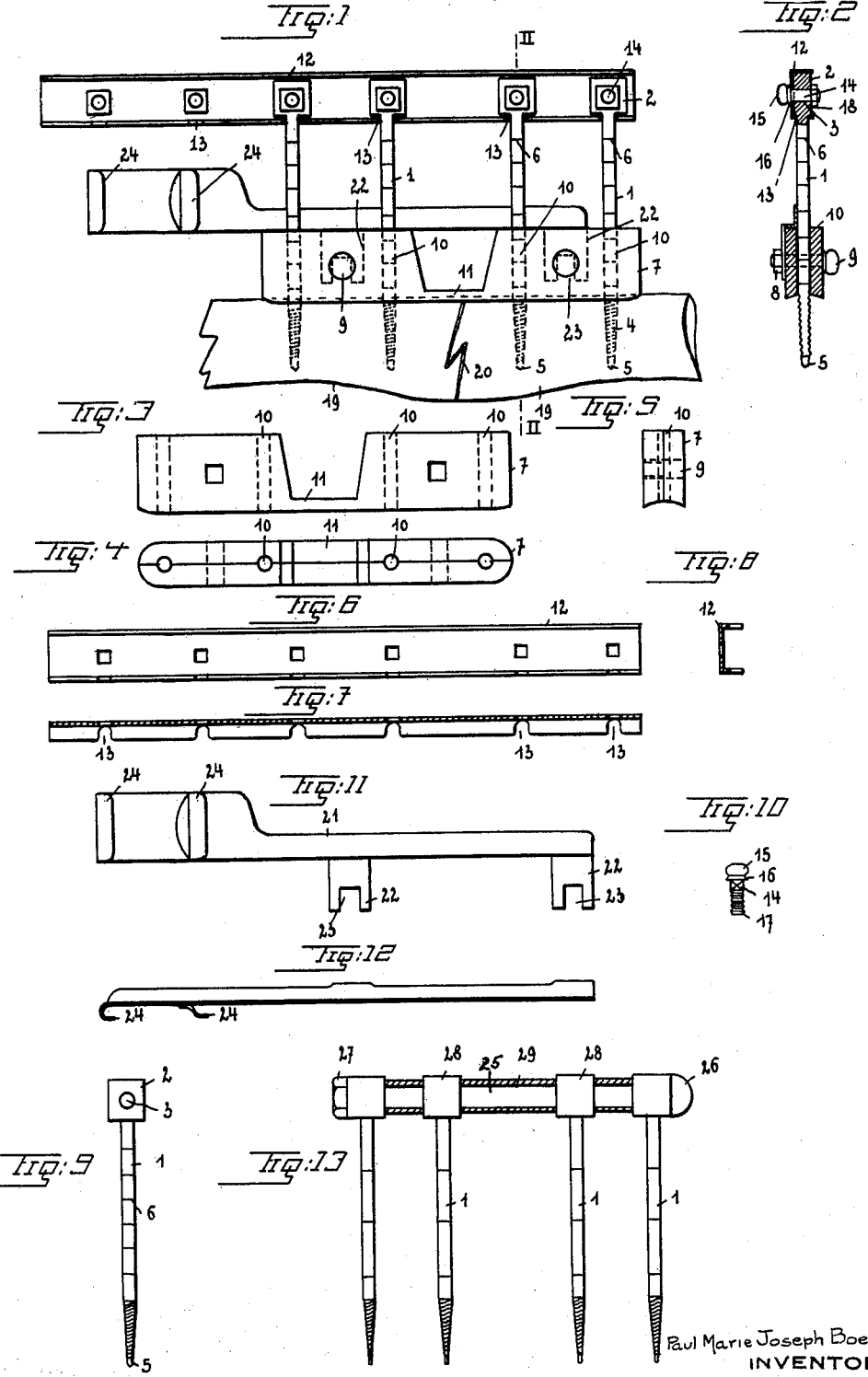
Paul Marie Joseph Boever
INVENTOR;
his Attorney.

Patented May 29, 1934

1,960,892

UNITED STATES PATENT OFFICE 1,960,892

LONG BONE FRACTURE CLAMP

Paul Marie Joseph Boever, Brussels, Belgium, assignor of fifty per cent to Manufacture Belge de Gembloux, Société Anonyme, Gembloux, Belgium Application March 3, 1932, Serial No. 596,528
In Belgium March 7, 1931

2 Claims. (Cl. 128—92)

My invention relates to a long bone fracture clamp and has for its object to provide an apparatus of simple construction and light weight adapted to maintain in good position the fragments of a long bone fracture, preliminarily set by reduction with freely flowing blood, that is to say in an open wound, by means of a surgical intervention.

Use of plates, ribbons and hooks has already been suggested for maintaining in position fragments of a fractured bone and further use has been made of screws inserted in the bony fragments and externally maintained by means of a clamp or fixing member. The apparatus of the latter kind present, however serious disadvantages which result from the fact that it is not possible to obtain true parallelism of the screws in their straight position in the axial direction, so that the fixing member cannot be secured to the screws except by means of a complicated arrangement of joints, which are relatively heavy, and which result in the fixing member being placed in an eccentric position outside the axis of the screws and having its weight tending as a consequence to drag on the screws towards the outside.

My apparatus, has for its object to avoid these drawbacks and to permit only the minimum number of foreign bodies to remain in contact with the fractured bones, the foreign bodies being placed far from the seat of the fracture, which as a consequence, does not become irritated.

With this object in view, it is essentially characterized by the special arrangements and combinations of parts hereinafter fully described and pointed out in the appended claims.

On the annexed drawing:

Fig. 1 is a side elevation view of the whole of the apparatus in position as required by the progress of the operation.

Fig. 2 is a transverse section along the line II—II in Fig. 1.

Figs. 3, 4 and 5 are a side elevation, a plan and an end view, respectively, of a special guide in two pieces cooperating with the apparatus.

Figs. 6, 7 and 8 are, respectively, a side elevation, a longitudinal section and a transverse section of an external fixing member or clamp member.

Fig. 9 is a separate view of one of the screws and Fig. 10 is a separate view of one of the bolts for securing the anchoring rods to the fixing member.

Figs. 11 and 12 show in elevation and in plan, respectively, an extension which can be used with the apparatus.

Fig. 13 is a view of a variation in the construction particularly suited to apparatus of small dimensions.

Referring to the drawing and particularly to Figs. 1 and 2, the apparatus comprises long stainless steel screws 1 of approximately seven to ten centimetres in length and three millimetres in diameter. These screws are each provided with a large, flat head 2 which is provided with a centre bore 3 to receive a tightening nut. The head 2 has a form similar to that of the bits of a brace. The thread 4 of the screw extends over about three centimetres of its length, so as to bite on all its surface of contact with the bone when it is introduced into the epiphysis; its thread consists of wide and deep grooves so as to adhere well to the bony substance which it secures firmly. The extreme point 5 of each screw is pointed to form a triangular drill so as to prepare a way for the thread following. Besides, the threaded portion is tapered so as to be more firmly secured or embedded in the bone. These screws are placed by means of a suitable brace, provided with a hollow fitting exactly to the head of the screw which is in this way well held and is driven in without fatigue. They are provided, at spaced intervals, with graduations 6 of approximately one centimetre, spacing indicating constantly the extent of penetration of the screw into the bone. With these screws cooperate a guide 7, (Figs. 3 to 5) which is formed of two symmetrical halves, juxtaposed and maintained tightly together by means of two small nuts 8 engaging screws 9 passing through the pieces 7. This guide 7 is in two parts, and corresponds to an ordinary plate for bone synthesis provided with four holes 10 approximately equidistant. It has, at its mid section, a portion 11 of reduced thickness so as to be easily tightened by forceps which will secure the fragments at the level of the place of fracture. When the two parts are assembled, the holes 10 form channel borings through which the screws 1 pass before reaching the bone. In this way these screws are maintained in true parallelism, i. e., in one and the same plane in the transverse direction and absolutely straight in the longitudinal direction.

It is to be noted that during a surgical operation the channels or borings of the device protect the screws from contact with foreign matter and ensure a complete asepsis, since they do not come in contact with the hands or with the skin and tissues.

The apparatus is completed by an external clamp or fixing member 12 (Figs. 6 to 8) comprising a solid, but light weight, piece of stainless steel, having for example a U-section, which rigidly holds the heads of the screws and thereby maintains the bony fragments firmly together and in contact. When the external clamp 12 is positioned, the square heads 2 of the screws 1 automatically position themselves in the hollow of the prop or clamp which prevents them from rising or falling. The clamp is provided, in addition, with notches 13 allowing the screw rods to pass, so as to prevent them from moving to the right or to the left. The screws 1 are secured in position in the prop or external fixing member 12 by means of bolts 14 (Fig. 10) each thereof being provided with a smooth round head 15, which is easy to engage. These screws each have a square portion 16 passing through the wall of the clamp so as to be fixed therein. On the threaded portion 17 of each bolt, a square nut 18 is tightened by means of a spanner.

In the operation of the apparatus, a brace is fitted to the heads 2 of the screws 1 and a spanner preferably having the shape of a T is disposed over all the nuts which are of a single type.

When the device is put in use, and before any other operation is carried out, the tissues are cut, the bony ends are cleaned and the bones are properly set. The guide 7 illustrated in Fig. 1 is then placed flat on the bone 19 without separating the periosteum. The thinned portion 11 of the guide 7 is placed over the place of fracture 20 and the bone and the guide are fixed by means of forceps (not shown) the upper jaw of which engages the notch of the guide while the lower jaw engages underneath the place of fracture. The four screws 1 are then inserted into the bone structure in a suitable manner, each screw taking the same number of turns of the brace, which is shown by the marks 6, and the clamp or external fixing member 12 which is finally placed. The clamp 12 is then tightened by the screws 14. With the same spanner, the two nuts 8 of the guide 7 are unscrewed to liberate each half of the latter, the nuts being removed and after which it remains only to wipe the wound and to sew the teguments, to be followed subsequently by the usual dressing.

It will be clear that, owing to the use of the guide 7, the screws 1 are maintained in true parallelism and in the same plane. It follows that the clamp or external fixing member 12 may be positioned in the plane of the screws to which it can be locked without any complicated mechanical device; as the weight of the fixing member proper is effective in a line coinciding with the line of gravitation of the screw, the screws have no tendency to drag outwardly.

The apparatus described can, if desired, be completed by an extension 21 (Figs. 11 and 12) consisting of a plate provided with two lugs 22. The latter are provided with notches 23 engaging the screws 9 and serving to assemble the two halves of the guide 7. The extension is further provided with two recesses 24 permitting the use of one or more additional screws, with the same simplicity and the same safety as afforded by the guide 7 itself. It is not necessary to cut into the flesh, but simply to perforate the teguments. In certain cases e. g. in that of a comminuted fracture it might be found necessary after two screws 1 have been placed as wide apart as possible by means of the guide 7 to take as a support a portion far off the seat of the fracture. In such case the extension may be utilized on the guide to fulfil the same functions. The screw is then automatically adjusted and placed parallel and in line with the other screws already set, the head of the said screw registers with a hole provided in the external clamp member 12 which is, in this case, of considerable length, as shown in Fig. 1. The screws can therefore be driven into the bone through the teguments without fear of deviation.

The invention is not intended to be limited to the arrangement described above. It will be clear that various constructional details may be varied without departing from the spirit of the invention. In the case of a small sized apparatus, for instance, the external clamp member may be replaced, as shown in Figure 13, by a rod 25 of square cross section provided at one end with a head 26 and at the other with a nut 27. In that case the screws 1 are provided with cubical heads 28 sliding loosely on the rod 25 and are maintained at the required distance by sleeves 29 which are slipped over the rod 25 at the moment when the latter passes beyond the head 28 of said screw. The whole apparatus, in such case, is locked to the rod 25 constituting a clamping member, by means of the nut 27.

What I claim is:

1. In a long bone fracture clamp in combination with screws adapted to be introduced into the bony fragments, a guiding member adapted to be placed in immediate contact with the bone and formed of two symmetrical pieces provided on their inner surface with grooves adapted to form channels for the said screws when the two pieces are juxtaposed, the said grooves being drilled in such a manner that the parallelism of the said screws in the transverse direction and their straightness in the longitudinal direction are ensured, the said guiding member being provided with a portion of reduced height for the application of a forceps adapted to secure the fragments at the seat of fracture, an external clamp member and means whereby the said screws are connected to the said external clamp member.

2. In a long bone fracture clamp in combination with screws adapted to be introduced into the bony fragments, a guiding member adapted to be placed in immediate contact with the bone and formed of two symmetrical pieces provided on their inner surface with grooves adapted to form channels for the said screws when the two pieces are juxtaposed, the said grooves being drilled in such a manner that the parallelism of the said screws in the transverse direction and their straightness in the longitudinal direction are ensured, an external clamp member and means whereby the said screws are connected to the said external clamp member, the said external clamp member having the shape of Ɪ, one edge of which is provided with notches for the passage of the rods of the screws, the heads of which engage in the groove of the said external clamp member.

PAUL MARIE JOSEPH BOEVER.